(12) United States Patent
Kohori

(10) Patent No.: US 10,535,447 B2
(45) Date of Patent: Jan. 14, 2020

(54) ELECTRIC WIRE COATED WITH MULTIPLE INSULATING LAYERS HAVING DIFFERENT ELASTIC MODULUS

(71) Applicant: SUMITOMO ELECTRIC INDUSTRIES, LTD., Osaka (JP)

(72) Inventor: Takaya Kohori, Tochigi (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/243,441

(22) Filed: Jan. 9, 2019

(65) Prior Publication Data

US 2019/0228874 A1 Jul. 25, 2019

(30) Foreign Application Priority Data

Jan. 22, 2018 (JP) .................................. 2018-008223

(51) Int. Cl.
*H01B 11/02* (2006.01)
*B60R 16/023* (2006.01)
*B60R 16/03* (2006.01)
*H01B 7/04* (2006.01)
*H01B 7/02* (2006.01)
*H01B 3/44* (2006.01)
*H01B 11/00* (2006.01)
*H01B 7/18* (2006.01)

(52) U.S. Cl.
CPC ............ *H01B 7/0216* (2013.01); *H01B 3/441* (2013.01); *H01B 7/187* (2013.01); *H01B 11/002* (2013.01); *H01B 11/02* (2013.01); *B60R 16/023* (2013.01); *B60R 16/03* (2013.01); *H01B 7/04* (2013.01)

(58) Field of Classification Search
CPC .......... C08L 23/00; C08L 83/04; C08L 91/06; C08L 101/00; H01B 7/34
USPC ......................................................... 174/115
See application file for complete search history.

(56) References Cited

U.S. PATENT DOCUMENTS

| | | | | |
|---|---|---|---|---|
| 3,852,518 A | * | 12/1974 | Wargotz | H01B 7/0275 174/120 SR |
| 4,962,992 A | * | 10/1990 | Chapin | B29D 11/00663 385/102 |
| 5,104,433 A | * | 4/1992 | Chapin | B29D 11/00663 65/432 |
| 5,521,009 A | * | 5/1996 | Ishikawa | H01B 3/30 174/110 R |
| 5,912,436 A | * | 6/1999 | Sanchez | H01B 3/441 174/121 A |

(Continued)

FOREIGN PATENT DOCUMENTS

JP 2002-270048 9/2002

OTHER PUBLICATIONS

Agilent Technologies "Measuring the Complex Modulus of Polyethylene Using Instrumented Indentation" (Year: 2011).*

*Primary Examiner* — Timothy J Thompson
*Assistant Examiner* — Michael F McAllister
(74) *Attorney, Agent, or Firm* — IPUSA, PLLC

(57) ABSTRACT

A coated wire according to the present disclosure includes a first conductor and a first insulating layer of resin covering the first conductor. The first insulating layer includes an inner layer and an outer layer. Further, a storage modulus of the inner layer at a temperature of 25° C. is less than 700 MPa, and a storage modulus of the outer layer at a temperature of 25° C. is not less than 700 MPa.

7 Claims, 3 Drawing Sheets

(56) References Cited

U.S. PATENT DOCUMENTS

| | | | | |
|---|---|---|---|---|
| 6,176,849 B1* | 1/2001 | Yang | ............... | A61L 29/085 |
| | | | | 604/265 |
| 6,392,153 B1* | 5/2002 | Horwatt | ............... | H01B 7/295 |
| | | | | 174/110 R |
| 8,013,251 B2* | 9/2011 | Bhandari | ............... | C08L 71/00 |
| | | | | 174/110 SR |
| 9,127,110 B2* | 9/2015 | Sugita | ............... | C08F 255/02 |
| 9,593,177 B2* | 3/2017 | Nummila-Pakarinen | ............... | |
| | | | | C08F 110/02 |
| 9,728,301 B2* | 8/2017 | Ikeda | ............... | H01B 3/305 |
| 2002/0127401 A1* | 9/2002 | Perego | ............... | C08F 255/02 |
| | | | | 428/375 |
| 2003/0059613 A1* | 3/2003 | Tirelli | ............... | H01B 7/295 |
| | | | | 428/375 |
| 2005/0217891 A1* | 10/2005 | Belli | ............... | H01B 7/0233 |
| | | | | 174/120 R |
| 2008/0281037 A1* | 11/2008 | Karjala | ............... | C08F 210/16 |
| | | | | 524/571 |
| 2012/0154099 A1* | 6/2012 | Fukuda | ............... | H01B 3/301 |
| | | | | 336/222 |
| 2012/0325515 A1* | 12/2012 | Steffl | ............... | C08L 23/04 |
| | | | | 174/110 SR |
| 2014/0102752 A1* | 4/2014 | Ushiwata | ............... | H01B 3/306 |
| | | | | 174/110 SR |
| 2014/0182883 A1* | 7/2014 | Sugita | ............... | H01B 3/447 |
| | | | | 174/113 R |
| 2015/0147571 A1* | 5/2015 | Alexander | ............... | C08L 23/04 |
| | | | | 428/391 |
| 2015/0310959 A1* | 10/2015 | Oya | ............... | H01B 13/14 |
| | | | | 174/110 SR |
| 2016/0163417 A1* | 6/2016 | Iwasaki | ............... | H01B 3/441 |
| | | | | 174/120 SR |
| 2017/0011822 A1* | 1/2017 | Nakamura | ............... | H01B 7/295 |
| 2017/0236618 A1* | 8/2017 | Fujimori | ............... | H01F 5/06 |
| | | | | 174/110 SR |

* cited by examiner

ELECTRIC WIRE COATED WITH MULTIPLE INSULATING LAYERS HAVING DIFFERENT ELASTIC MODULUS

CROSS-REFERENCE TO RELATED APPLICATIONS

This patent application is based on and claims priority to Japanese Patent Application No. 2018-008223 filed on Jan. 22, 2018, the entire contents of which are incorporated herein by reference.

BACKGROUND OF THE INVENTION

1. Field of the Invention

The present disclosure relates to a coated wire and a multicore cable.

2. Description of the Related Art

Patent Document 1 discloses an electric wire in which a conductive wire is coated with two layers of insulators.

Patent Document

[Patent Document 1] Japanese Laid-open Patent Publication No. 2002-270048

SUMMARY OF THE INVENTION

According to an aspect of the present disclosure, there is provision of a coated wire including a first conductor and a first insulating layer of resin covering the first conductor. The first insulating layer includes an inner layer and an outer layer, a storage modulus of the inner layer at a temperature of 25° C. is less than 700 MPa, and a storage modulus of the outer layer at a temperature of 25° C. is not less than 700 MPa.

According to another aspect of the present disclosure, there is provision of a multicore cable including multiple coated wires each of which is the above mentioned coated wire and a sheath covering the coated wires. The multiple coated wires are twisted.

DETAILED DESCRIPTION OF THE PREFERRED EMBODIMENTS

Outline of Embodiment

Figure 1:
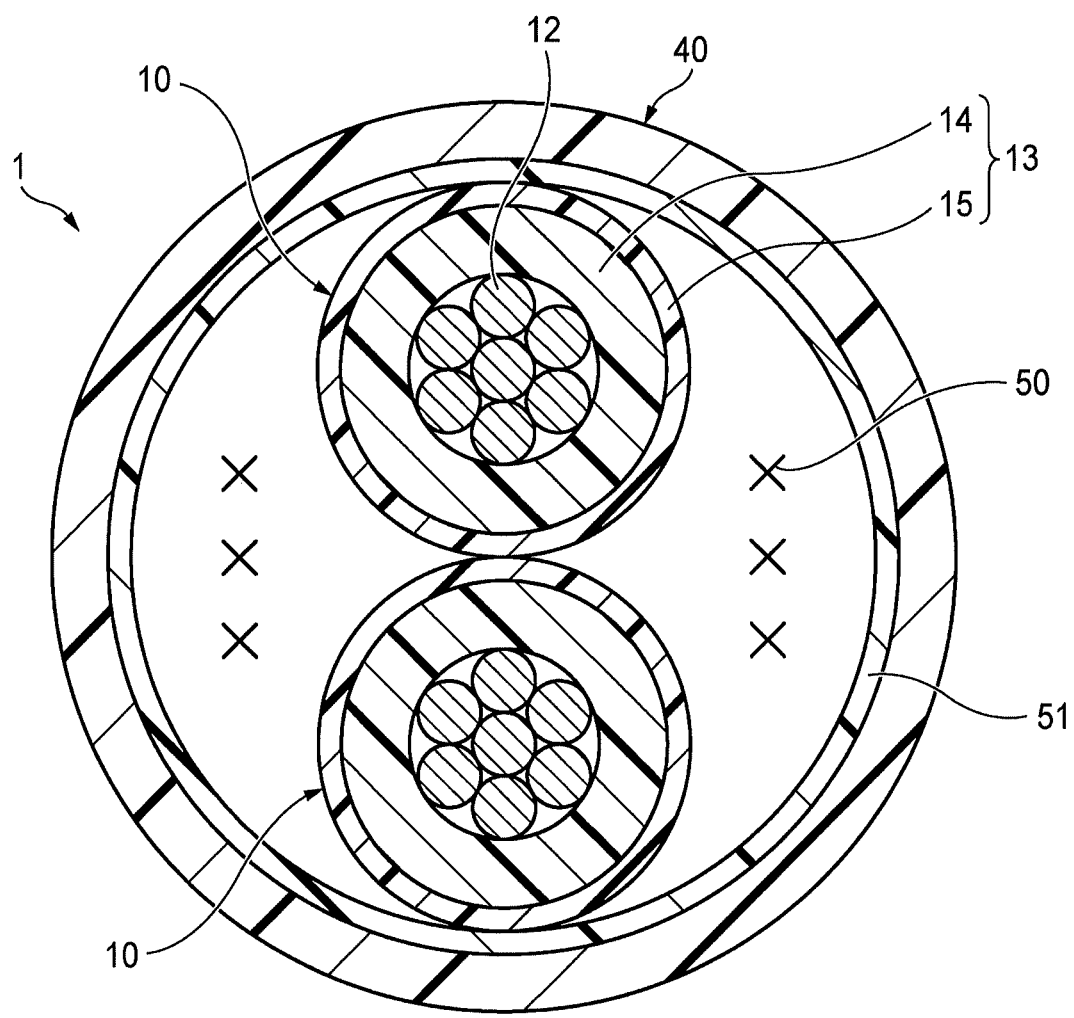
FIG. 1 is a cross-sectional view of a multicore cable according to an embodiment.

First, an outline of embodiments of the present disclosure is described.

A coated wire according to the present disclosure is (1) an electric wire including a first conductor and a first insulating layer of resin covering the first conductor. The first insulating layer includes an inner layer and an outer layer, a storage modulus of the inner layer at a temperature of 25° C. is less than 700 MPa, and a storage modulus of the outer layer at a temperature of 25° C. is not less than 700 MPa.

According to the above described structure, a coated wire having superior abrasion resistance can be provided.

(2) Also, the coated wire of (1) may preferably be configured such that the inner layer is thicker than the outer layer.

According to the above described structure, a coated wire also having superior flex resistance can be provided.

(3) Also, the coated wire of (1) or (2) may preferably be configured such that the storage modulus of the inner layer at a temperature of 25° C. is 200 MPa or less.

According to the above described structure, a coated wire having further superior abrasion resistance can be provided.

(4) Also, the coated wire of any one of (1) to (3) may preferably be configured such that the storage modulus of the outer layer at a temperature of 25° C. is not less than 1000 MPa.

According to the above described structure, a coated wire having further superior abrasion resistance can be provided.

(5) Also, the coated wire of any one of (1) to (4) may preferably be configured such that the inner layer is made from polyethylene, a copolymer of ethylene and α-olefin containing a carbonyl group, or a mixture of polyethylene and a copolymer of ethylene and α-olefin containing a carbonyl group, and that the outer layer is made from polyethylene.

According to the above described structure, a coated wire having further superior abrasion resistance can be provided.

(6) Also, the coated wire of any one of (1) to (5) may preferably be configured such that the outer layer is made from a mixture of high-density polyethylene and low-density polyethylene.

According to the above described structure, a coated wire having further superior abrasion resistance can be provided.

Further, a multicore cable according to the present disclosure includes (7) multiple coated wires each being the coated wire of any one of (1) to (6), and a sheath covering the multiple coated wires. In the multicore cable, the multiple coated wires are twisted.

According to the above described structure, a multicore cable including the coated wires having superior abrasion resistance can be provided. In addition, the above described structure makes wiring work easier as compared to a case in which multiple coated wires are to be wired separately.

(8) Also, the multicore cable of (7) includes multiple electric wires thinner than the coated wire. Each of the electric wires includes a second conductor thinner than the first conductor and a second insulating layer covering the second conductor. The multicore cable may preferably be configured such that the multiple electric wires are twisted into a twisted pair cable, and that the multiple coated wires and the twisted pair cable are twisted together.

The above mentioned structure of the multicore cable makes wiring work easier as compared to a case in which the multiple coated wires and the multiple electric wires are to be wired separately. Further, because the multiple coated wires and the twisted pair cable are twisted and covered with the sheath, a shape of the outer circumference of the multicore cable becomes stable.

Details of Embodiments

Next, the embodiments of the present disclosure will be described with reference to FIG. 1.

A multicore cable 1 is, for example, used for connecting an electronic control unit (ECU) installed in a vehicle with an electric park brake (EPB), a wheel speed sensor, and the like provided around a wheel. The wheel is supported by a body of the vehicle such that the wheel can rotate around an axle. The wheel may be supported by the body via a suspension system or a steering system. That is, the wheel is displaceably supported by the body. The multicore cable 1 according to the present embodiment is preferably used for connecting, with the ECU fixed to the body, parts attached to the wheel displaceably supported by the body.

Because the multicore cable 1 is routed in a small space of a wheel well in which a wheel is housed, the multicore cable 1 is required to bend easily so as not to hinder displacement of the wheel, and is required to have high durability against a large amount of bending.

FIG. 1 is a cross-sectional view of the multicore cable 1 according to the present embodiment. A cross section orthogonal to a longitudinal direction of the multicore cable 1 is illustrated in FIG. 1. As illustrated in FIG. 1, the multicore cable 1 includes two coated wires 10 and a sheath 40. An outer diameter of the multicore cable 1 according to the present embodiment may be not less than 6 mm and not more than 12 mm, and preferably be not less than 7 mm and not more than 10.5 mm.

(Coated Wire)

Each of the two coated wires 10 includes a first conductor 12 and a first insulating layer 13 covering the first conductor 12. Each of the two coated wires 10 has the same size and is made from the same material.

The two coated wires 10 can be used for connecting the EPB with the ECU. The EPB includes a motor for actuating a brake caliper. For example, one of the coated wires 10 may be used as a feeder wire to supply electric power to the motor of the EPB, and the other one of the coated wires 10 may be used as a ground wire for the motor. An outer diameter of the coated wire 10 can be not less than 1.2 mm and not more than 4.2 mm.

The first conductor 12 is formed by twisting multiple conductors. Note that any one of a solid wire, a stranded wire, a cord of rope-lay stranded wires, and a set of twisted cords can be used as the first conductor 12. The conductor is a wire made from copper or copper alloy. The conductor may also be made from material having predetermined conductivity and flexibility, such as a tinned annealed copper wire or an annealed copper wire, or may be made from a hard drawn copper wire. A cross-sectional area of the first conductor 12 can be not less than 0.25 mm$^2$ and not more than 3.0 mm$^2$, and an outer diameter of the first conductor 12 can be not less than 0.6 mm and not more than 2.6 mm.

The first insulating layer 13 includes an inner layer 14 and an outer layer 15 provided at an outer circumference of the inner layer 14. An outer diameter of the first insulating layer 13 can be not less than 2 mm and not more than 4 mm. The inner layer 14 may preferably be thicker than the outer layer 15. As will be described below, because a storage modulus of the inner layer 14 at a temperature of 25° C. is less than that of the outer layer 15 at a temperature of 25° C., flex resistance of the coated wire 10 is improved by forming the inner layer 14 to be thicker. A thickness of the inner layer 14 can be not less than 0.1 mm and not more than 0.4 mm, and a thickness of the outer layer 15 can be not less than 0.03 mm and not more than 0.4 mm.

The storage modulus of the inner layer 14 at a temperature of 25° C. is less than 700 MPa. The storage modulus is a physical property that can be measured by dynamic mechanical spectroscopy (DMS). Also, in order to further improve abrasion resistance, the storage modulus of the inner layer 14 at a temperature of 25° C. may preferably be 200 MPa or less, and more preferably, 100 MPa or less. Further, the storage modulus of the inner layer 14 at a temperature of 25° C. may be not less than 1 MPa. The inner layer 14 may be made from polyethylene, a copolymer of ethylene and α-olefin containing a carbonyl group, a mixture of polyethylene and a copolymer of ethylene and α-olefin containing a carbonyl group, or other types of elastomers. In order to further improve abrasion resistance, the inner layer 14 may preferably be made from polyethylene, a copolymer of ethylene and α-olefin containing a carbonyl group, or a mixture of polyethylene and a copolymer of ethylene and α-olefin containing a carbonyl group.

Types of polyethylene to be used in the inner layer 14 are not limited to a specific type, as long as a storage modulus of the polyethylene at a temperature of 25° C. is less than 700 MPa, but it is preferable that low-density polyethylene (LDPE) or very-low-density polyethylene (VLDPE) is used.

For example, as α-olefin containing a carbonyl group, at least one of alkyl (meth)acrylic ester such as methyl (meth)acrylate and ethyl (meth)acrylate, aryl (meth)acrylic ester such as phenyl (meth)acrylate, vinyl ester such as vinyl acetate and vinyl propionate, unsaturated acid such as (meth)acrylic acid, crotonic acid, maleic acid, and itaconic acid, vinyl ketone such as methyl vinyl ketone and phenyl vinyl ketone, and (meth)acrylamide, may preferably be used. That is, a copolymer of ethylene and α-olefin containing a carbonyl group contained in the inner layer 14 may be a mixture of different copolymers having different carbonyl group-containing α-olefins.

In the copolymer of ethylene and α-olefin containing a carbonyl group, a ratio of structures derived from α-olefin containing a carbonyl group may preferably be not less than 5 wt % and not more than 46 wt %, and more preferably be not less than 10 wt % and not more 30 wt %. In a case in which the ratio is less than 5 wt %, sufficient flex resistance at low temperature may not be obtained. In a case in which the ratio is more than 46 wt %, abrasion resistance may deteriorate.

As the other types of elastomers, thermoplastic polyurethane elastomer (TPU) can be used in the inner layer 14.

The inner layer 14 may contain other material for improving flexibility or shock resistance. For example, a copolymer of ethylene and unsaturated hydrocarbon having more than three carbons (such as ethylene-butene copolymer) may be contained. Further, in order to improve flame-resistance, metal hydroxide, metal oxide, other flame retardant, or a mixture of these materials may be added to the inner layer 14. Alternatively, the inner layer 14 may be made from only polyethylene, a copolymer of ethylene and α-olefin containing a carbonyl group, or a mixture of polyethylene and a copolymer of ethylene and α-olefin containing a carbonyl group.

A storage modulus of the outer layer 15 at a temperature of 25° C. is not less than 700 MPa. Also, in order to further improve abrasion resistance, the storage modulus of the outer layer 15 at a temperature of 25° C. may preferably be 1000 MPa or more, and more preferably, 1500 MPa or more. The outer layer 15 may be made from polyethylene or fluororesin, and preferably be made from polyethylene. It is preferable that high-density polyethylene (HDPE) or a mixture of LDPE and HDPE is used as polyethylene for the outer layer 15. Also, in order to further improve abrasion resistance, it is more preferable that a mixture of LDPE and HDPE is used as polyethylene for the outer layer 15. A preferable range of a mixture ratio of LDPE and HDPE (hereinafter denoted as "LDPE:HDPE") in the mixture of LDPE and HDPE is from LDPE:HDPE=30:70 to 60:40, and more preferably from 45:55 to 55:45.

(Twisting Direction, Twisting Pitch)

The two coated wires 10 are twisted into a single unit (hereinafter, the twisted two coated wires 10 forming the single unit may also be referred to as a "first twisted pair cable"). A twisting pitch of the twisted two coated wires 10 (first twisted pair cable) may be set to a range of 12 to 24 times of a twisting diameter of the first twisted pair cable (an outer diameter of the first twisted pair cable). If a twisting pitch is greater than 24 times of a twisting diameter, flex resistance may decrease because twisting becomes loosened. In a case in which a twisting pitch is small, it does not affect flex resistance but productivity of a cable may deteriorate.

(Sheath)

The two coated wires 10 are covered with the sheath 40. The sheath 40 can be made from, for example, polyolefin-based resin such as polyethylene and ethylene-vinyl acetate copolymer (EVA), polyurethane elastomer, polyester elastomer, or a composition formed by mixing at least two of the above mentioned materials. Alternatively, the sheath 40 may be made from, for example, crosslinked/non-crosslinked thermoplastic polyurethane (TPU) having good abrasion resistance. Considering abrasion resistance, the sheath 40 may preferably be made from crosslinked thermoplastic polyurethane.

(Filler)

The multicore cable 1 may include filler 50. The filler 50 is provided inside the sheath 40. The filler 50 can be formed of fiber such as spun rayon yarn or nylon yarn. The filler 50 may be formed of high tensile strength fiber. The filler 50 is provided between the two coated wires 10 and the sheath 40.

(Separation Member)

The multicore cable 1 may include a separation member 51. The separation member 51 covers the two coated wires 10. The separation member 51 may be resin such as polyester, or may be wrapping tape wrapping around the two coated wires 10, which is made of nonwoven fabric or paper tape. The separation member 51 stably maintains a shape of the twisted two coated wires (first twisted pair cable). The separation member 51 is provided inside the sheath 40. The separation member 51 may be wound spirally around the two coated wires 10, or attached with the long direction along the two coated wires 10. Also, the separation member 51 may be wound in any direction, clockwise direction (S-twist) or counter-clockwise direction (Z-twist).

As the separation member 51 acts as a cushion, improves flexibility, and has a protection effect, the filler 50 and the sheath 40 can be formed thinner in a case in which the separation member 51 is provided. As described above, by providing the separation member 51, a multicore cable 1 which is flexible and having good abrasion resistance can be provided.

Further, in a case in which the sheath 40 of resin is provided by extrusion coating, because the resin permeates a gap between the two coated wires 10 and the two coated wires 10 adhere to each other, it may become difficult to separate the two coated wires 10 at a terminal of the multicore cable 1. By providing the separation member 51, as the separation member 51 prevents the resin from permeating the gap between the two coated wires 10, separating the two coated wires 10 at the terminal of the multicore cable 1 becomes easier.

(Effect)

In the coated wire 10 according to the present embodiment, the first insulating layer 13 includes the inner layer 14 and the outer layer 15, the storage modulus of the inner layer 14 at a temperature of 25° C. is less than 700 MPa, and the storage modulus of the outer layer 15 at a temperature of 25° C. is not less than 700 MPa. A conventional electric wire, on which an insulating layer is formed by only using material generally said to be hard, is considered to have good abrasion resistance. Surprisingly, the coated wire 10 according to the present embodiment has better abrasion resistance as compared to the conventional electric wire.

Also, the multicore cable 1 according to the present embodiment includes the twisted two coated wires 10 and the sheath 40. This structure makes wiring work easier as compared to a case in which multiple coated wires 10 are to be wired separately. Further, because the coated wires 10 having good abrasion resistance can be wired, the multicore cable 1 can be suitably used in an environment in which high abrasion resistance is required.

First Modified Embodiment

Next, a first modified embodiment of the present embodiment will be described with reference to FIG. 2.

Figure 2:
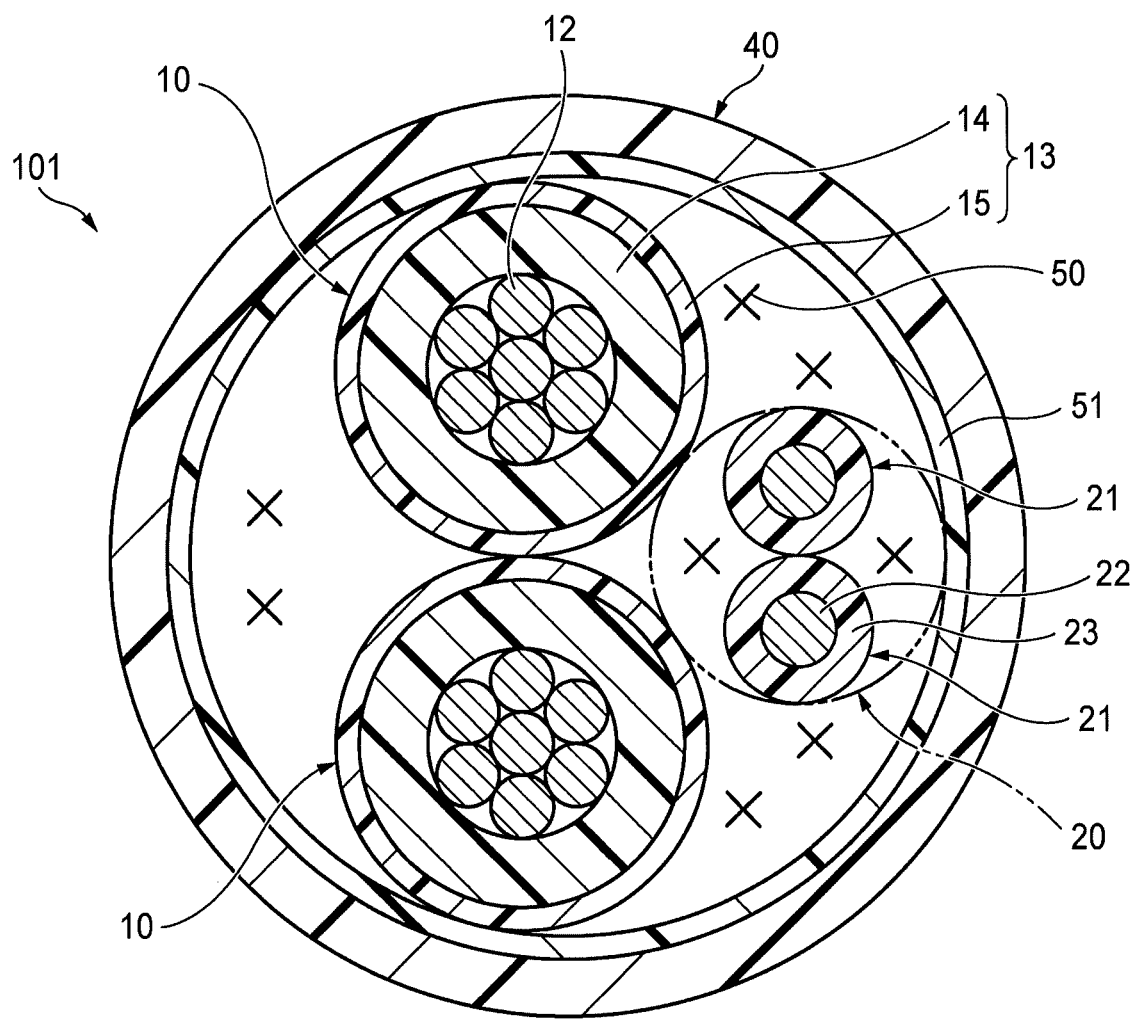
FIG. 2 is a cross-sectional view of a multicore cable according to a first modified embodiment.

FIG. 2 is a cross-sectional view of a multicore cable 101 according to the first modified embodiment. A cross section orthogonal to a longitudinal direction of the multicore cable 101 is illustrated in FIG. 2. As illustrated in FIG. 2, the multicore cable 101 includes two coated wires 10, two second wires 21, and a sheath 40. As a structure of the coated wire 10 is similar to that described above, descriptions of the coated wire 10 will be omitted. An outer diameter of the multicore cable 101 according to the first modified embodiment may be not less than 7 mm and not more than 15 mm, and preferably be not less than 7.5 mm and not more than 12 mm.

(Second Wire)

Each of the two second wires 21 includes a second conductor 22 thinner than the first conductor 12, and a second insulating layer 23 covering the second conductor 22. Each of the two second wires 21 has the same size and is made from the same material. By the two second wires 21 being twisted, a second twisted pair cable 20 is formed. A twisting pitch of the second twisted pair cable 20 may be set to a range of 10 to 15 times of a twisting diameter (an outer diameter) of the second twisted pair cable 20.

The outer diameter of the second twisted pair cable 20 may be approximately the same as that of the coated wire 10.

The second wire 21 can be used for transmitting a signal from a sensor, or for transmitting a control signal from an ECU. For example, the two second wires 21 can be used as wires for an anti-lock braking system (ABS). For example, each of the two second wires 21 can be used for connecting a wheel speed sensor of differential signaling type and an ECU of a vehicle.

The second conductor 22 may be a solid wire, or may be formed by twisting multiple conductors, similar to the coated wire 10. The second conductor 22 may be made from the same material as that of the first conductor 12. Alternatively, the second conductor 22 may be made from a different material from that of the first conductor 12. A cross-sectional area of the second conductor 22 can be not less than 0.13 mm$^2$ and not more than 0.5 mm$^2$.

The second insulating layer 23 can be made from crosslinked polyethylene to which flame retardant is added in order to have flame-resistance. Material forming the second insulating layer 23 is not limited to polyolefin-based resin having flame-resistance. Other materials such as crosslinked fluorine-based resin may be used. An outer diameter of the second insulating layer 23 can be not less than 1.0 mm and not more than 2.2 mm.

(Sheath)

All wires including the two coated wires 10 and the two second wires 21 are covered with a sheath 40. The two coated wires 10 and the second twisted pair cable 20 are twisted together into a single unit. The sheath 40 covers the two coated wires 10 and the second twisted pair cable 20 in a state of being twisted into the single unit (hereinafter, this single unit made by twisting the two coated wires 10 and the second twisted pair cable 20 may also be referred to as a "first wire unit"). As material for forming the sheath 40 is similar to that described above, descriptions of the material will be omitted.

(Twisting Direction, Twisting Pitch)

A twisting pitch of the first wire unit may be set to a range of 12 to 24 times of a twisting diameter (an outer diameter) of the first wire unit. It is preferable that a ratio of the twisting pitch of the first wire unit to the twisting diameter of the first wire unit is greater than a ratio of the twisting pitch of the second twisted pair cable 20 to the twisting diameter of the second twisted pair cable 20. Also, a twisting direction of the first wire unit may preferably be different from a twisting direction of the second twisted pair cable 20.

(Filler)

The multicore cable 101 may include filler 50. As material forming the filler 50 is similar to that described above, descriptions of material will be omitted. The filler 50 may be provided between the coated wire 10 and the second wire 21, and between the two second wires 21.

(Separation Member)

The multicore cable 101 may include a separation member 51. By the separation member 51 being provided, the multicore cable 101 is expected to have similar effects to the above described effects. The separation member 51 covers the two coated wires 10 and the second twisted pair cable 20. The separation member 51 stably maintains a shape of the first wire unit (which is formed by twisting the two coated wires 10 and the second twisted pair cable 20). The separation member 51 is provided inside the sheath 40. As material forming the separation member 51 is similar to that described above, descriptions of material will be omitted.

The separation member 51 may be wound spirally around the first wire unit, or attached with the long direction along the first wire unit. Also, the separation member 51 may be wound in any direction, clockwise direction (S-twist) or counter-clockwise direction (Z-twist). A winding direction of the separation member 51 may be the same as a twisting direction of the second twisted pair cable 20, or may be different. However, if a winding direction of the separation member 51 is different from a twisting direction of the second twisted pair cable 20, unevenness of a surface of the separation member 51 is less likely to occur, and a shape of an outer circumference of the multicore cable 101 tends to be stable. Therefore, it is preferable that a winding direction of the separation member 51 is different from a twisting direction of the second twisted pair cable 20.

(Effect)

The multicore cable 101 according to the first modified embodiment includes the two second wires 21 each of which is thinner than the coated wire 10. By the two second wires 21 being twisted, the second twisted pair cable 20 is formed. Also, in the multicore cable 101, two of the coated wires 10 and the second twisted pair cable 20 are twisted. The above mentioned structure of the multicore cable 101 makes wiring work easier as compared to a case in which the two coated wires 10 and the two second wires 21 are to be wired separately. Further, because the two coated wires 10 and the second twisted pair cable 20 are twisted and covered with the sheath 40, a shape of the outer circumference of the multicore cable 101 becomes stable.

Second Modified Embodiment

A multicore cable according to the present disclosure may also include other electric wires different from the two coated wires 10 or the two second wires 21. A second modified embodiment of the present embodiment will be described with reference to FIG. 3.

Figure 3:
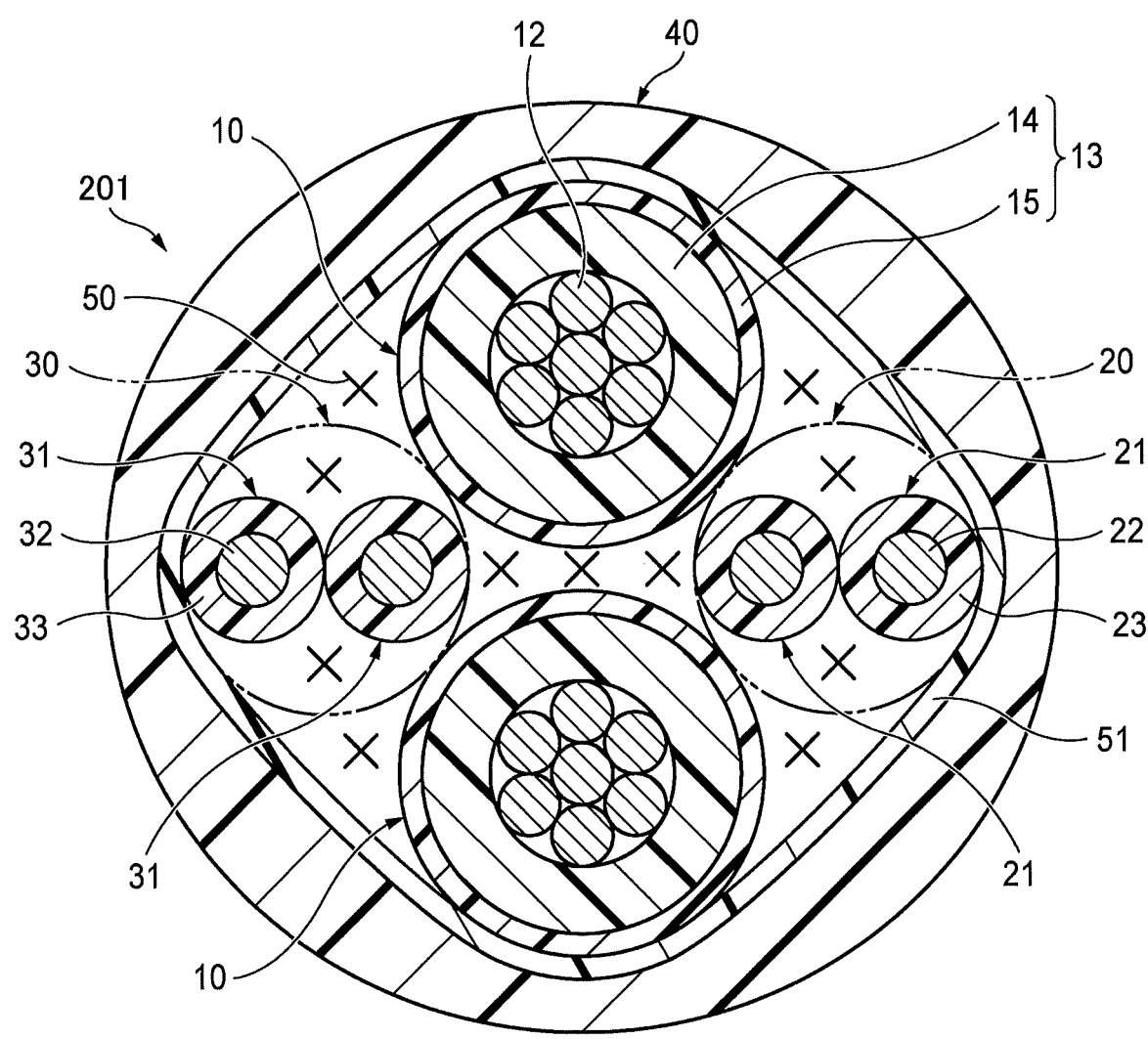
FIG. 3 is a cross-sectional view of a multicore cable according to a second modified embodiment.

FIG. 3 is a cross-sectional view of a multicore cable 201 according to the second modified embodiment. A cross section orthogonal to a longitudinal direction of the multicore cable 201 is illustrated in FIG. 3. As illustrated in FIG. 3, the multicore cable 201 includes two coated wires 10, two second wires 21, two third wires 31, and a sheath 40. As structures of the coated wire 10 and the second wire 21 are similar to those described above, descriptions of the coated wire 10 and the second wire 21 will be omitted. An outer diameter of the multicore cable 201 according to the second modified embodiment may be not less than 8 mm and not more than 16 mm.

(Third Wire)

Each of the two third wires 31 includes a third conductor 32 thinner than the first conductor 12, and a third insulating layer 33 covering the third conductor 32. By the two third wires 31 being twisted, a third twisted pair cable 30 is formed. Each of the two third wires 31 has the same size and is made from the same material. The third wire 31 and the second wire 21 may be the same in size and material. It is preferable that the third twisted pair cable 30 and the second twisted pair cable 20 have the same twisting direction. It is preferable that the third twisted pair cable 30 and the second twisted pair cable 20 have the same twisting pitch. If a twisting direction of the third twisted pair cable 30 and a twisting direction of the second twisted pair cable 20 are different, the twisting pitch the twisted pair cable having the shorter twisting pitch becomes longer so as to conform to the twisting pitch of the other twisted pair cable having the longer twisting pitch, and flex resistance may deteriorate.

The outer diameter of the third twisted pair cable 30 may be approximately the same as that of the second twisted pair cable 20. The outer diameter of the third twisted pair cable 30 may be approximately the same as that of the coated wire 10.

The third wire 31 can be used for transmitting a signal from a sensor, or for transmitting a control signal from an ECU. In addition, the third wire 31 can be used as a feeder wire for supplying electric power to electronic equipment.

The third conductor 32 may be a solid wire, or may be formed by twisting multiple conductors, similar to the coated wire 10. The third conductor 32 may be made from the same material as that of the first conductor 12 or the second conductor 22. Alternatively, the third conductor 32 may be made from a different material from that of the coated wire 10 or the second conductor 22. A cross-sectional area of the third conductor 32 can be not less than 0.13 mm$^2$ and not more than 0.5 mm$^2$.

Material forming the third insulating layer 33 may be the same as that of the second insulating layer 23, or may be different. An outer diameter of the third insulating layer 33 can be not less than 1.0 mm and not more than 2.8 mm.

(Sheath)

All wires including the two coated wires 10, the two second wires 21, and the two third wires 31 are covered with a sheath 40. The two coated wires 10, the second twisted pair cable 20, and the third twisted pair cable 30 are twisted together into a single unit. The sheath 40 covers the two coated wires 10, the second twisted pair cable 20, and the third twisted pair cable 30 in a state of being twisted into the single unit (hereinafter, this single unit made by twisting the two coated wires 10, the second twisted pair cable 20, and the third twisted pair cable 30 may also be referred to as a "second wire unit"). As material for making the sheath 40 is similar to that described above, descriptions of the material will be omitted.

(Twisting Direction, Twisting Pitch)

A twisting pitch of the second wire unit may be set to a range of 12 to 24 times of a twisting diameter (an outer diameter) of the second wire unit. It is preferable that a ratio of the twisting pitch of the second wire unit to the twisting diameter of the second wire unit is greater than a ratio of the twisting pitch of the second twisted pair cable 20 to the twisting diameter of the second twisted pair cable 20. Also, a twisting direction of the second wire unit may preferably be different from a twisting direction of the second twisted pair cable 20 and the third twisted pair cable 30.

(Filler)

The multicore cable 201 may include filler 50. As material forming the filler 50 is similar to that described above, descriptions of material will be omitted. The filler 50 may be provided in gaps between the two coated wires 10, between the coated wire 10 and the second wire 21, between the coated wire 10 and the third wire 31, between the two second wires 21, and between the two third wires 31.

(Separation Member)

The multicore cable 201 may include a separation member 51. By the separation member 51 being provided, the multicore cable 201 is expected to have similar effects to the above described effects. The separation member 51 covers the two coated wires 10, the second twisted pair cable 20, and the third twisted pair cable 30. The separation member 51 stably maintains a shape of the second wire unit (which is formed by twisting the two coated wires 10, the second twisted pair cable 20, and the third twisted pair cable 30). The separation member 51 is provided inside the sheath 40. As material forming the separation member 51 is similar to that described above, descriptions of material will be omitted.

The separation member 51 may be wound spirally around the second wire unit, or attached with the long direction along the second wire unit. Also, the separation member 51 may be wound in any direction, clockwise direction (S-twist) or counter-clockwise direction (Z-twist). A winding direction of the separation member 51 may be the same as a twisting direction of the second twisted pair cable 20 or the third twisted pair cable 30, or may be different. However, if a winding direction of the separation member 51 is different from a twisting direction of the second twisted pair cable 20 or the third twisted pair cable 30, unevenness of a surface of the separation member 51 is less likely to occur, and a shape of an outer circumference of the multicore cable 201 tends to be stable. Therefore, it is preferable that a winding direction of the separation member 51 is different from a twisting direction of the second twisted pair cable 20 or the third twisted pair cable 30.

EXAMPLES

Coated wires of Example 1, Example 2, and Example 3 were manufactured, and abrasion resistance of these coated wires was evaluated. In the following, structures of these coated wires and an evaluation result of the abrasion resistance will be described. Note that the examples described below are not intended for limiting scope of the present invention, and the scope of the present invention should be determined by the claims and equivalents thereof.

Example 1

By twisting 7 stranded wires, each stranded wire being formed by twisting 72 metal strands, each of which is made of tin-copper alloy (an alloy of tin and copper) and each of which has a diameter of 0.08 mm, a conductor having a cross sectional area of 2.5 mm$^2$ was obtained. The coated wire of Example 1 was made by covering the conductor with an insulating layer including an inner layer having a thickness of 0.2 mm and an outer layer having a thickness of 0.1 mm. The inner layer was made from a copolymer of ethylene and ethyl (meth)acrylate (EEA). The outer layer was made from a mixture of high-density polyethylene (HDPE) and low-density polyethylene (LDPE), and a ratio (weight ratio) between the HDPE and the LDPE was 50:50. A storage modulus of the EEA used in Example 1 at a temperature of 25° C. was 130 MPa, and a storage modulus of the mixture of the HDPE and the LDPE at a temperature of 25° C. was 1500 MPa.

Example 2

The coated wire of Example 2 is similar to the coated wire of Example 1, except that an inner layer of the coated wire of Example 2 is replaced with a mixture of high-density polyethylene (HDPE) and low-density polyethylene (LDPE) whose storage modulus at a temperature of 25° C. is 1500 MPa. That is, an insulating layer of the coated wire of Example 2 is a single layer. With respect to other points, structures of the coated wire of Example 2 are the same as the coated wire of Example 1.

Example 3

The coated wire of Example 3 is similar to the coated wire of Example 1, except that an outer layer of the coated wire of Example 3 was replaced with a copolymer of ethylene and ethyl (meth)acrylate (EEA) whose storage modulus at a temperature of 25° C. is 130 MPa. That is, an insulating layer of the coated wire of Example 3 is a single layer. With respect to other points, structures of the coated wire of Example 3 are the same as the coated wire of Example 1.

<Abrasion Resistance Test>

Evaluations of abrasion resistance (abrasion resistance test) are performed in accordance with ISO 6722.1-2011 (E) 5.12.4.2. In the abrasion resistance test, a coated wire of a tested object is fixed on a testing stand, a needle is caused to be contact with an insulating layer of the fixed tested object, and the needle is reciprocated at a predetermined speed along an axial direction of the tested object by applying a predetermined vertical load to the needle. The test was carried out for each of the coated wires of Example 1, Example 2, and Example 3, and the number of times that the needle was reciprocated until the needle contacts the conductor was counted.

An average number of times that the needle was reciprocated until the needle contacts the conductor was, approximately 17700 in the coated wire of Example 1, approximately 7400 in the coated wire of Example 2, and approximately 600 in the coated wire of Example 3. As can be seen from the above result, it was found that the coated wire of Example 1 has extremely superior abrasion resistance as compared to the coated wires of Example 2 and Example 3. That is, it can be said that a coated wire having an insulating layer including an inner layer whose storage modulus at a temperature of 25° C. is less than 700 MPa and an outer layer whose storage modulus at a temperature of 25° C. is not less than 700 MPa has superior abrasion resistance.

What is claimed is:

1. A coated wire comprising:
    a first conductor; and
    a first insulating layer of resin covering the first conductor, the first insulating layer including an inner layer and an outer layer; wherein
    a storage modulus of the inner layer at a temperature of 25° C. is less than 200 MPa, and
    a storage modulus of the outer layer at a temperature of 25° C. is not less than 700 MPa.

2. The coated wire according to claim 1, wherein the inner layer is thicker than the outer layer.

3. The coated wire according to claim 1, wherein the storage modulus of the outer layer at a temperature of 25° C. is not less than 1000 MPa.

4. The coated wire according to claim 1, wherein the inner layer is made from polyethylene, a copolymer of ethylene and α-olefin containing a carbonyl group, or a mixture of polyethylene and a copolymer of ethylene and α-olefin containing a carbonyl group, and the outer layer is made from polyethylene.

5. The coated wire according to claim 1, wherein the outer layer is made from a mixture of high-density polyethylene and low-density polyethylene.

6. A multicore cable comprising:
    a plurality of coated wires each being the coated wire according to claim 1, the plurality of the coated wires being twisted; and
    a sheath covering the plurality of the coated wires.

7. The multicore cable according to claim 6, further comprising a plurality of electric wires thinner than the coated wire, each of the electric wires including a second conductor thinner than the first conductor and a second insulating layer covering the second conductor; wherein
    the plurality of the electric wires are twisted into a twisted pair cable,
    the plurality of the coated wires and the twisted pair cable are twisted together, and
    the sheath covers both the plurality of the coated wires and the twisted pair cable.

* * * * *